Nov. 23, 1954 D. E. SUNSTEIN 2,695,356

IMAGE NOISE SUPPRESSION SYSTEM

Filed Aug. 14, 1948

INVENTOR.
BY DAVID E. SUNSTEIN
Allen V. Hazeltine
AGENT

United States Patent Office 2,695,356

Patented Nov. 23, 1954

2,695,356

IMAGE NOISE SUPPRESSION SYSTEM

David E. Sunstein, Cynwyd, Pa., assignor to Philco Corporation, Philadelphia, Pa., a corporation of Pennsylvania Application August 14, 1948, Serial No. 44,361

6 Claims. (Cl. 250—20)

Figure 1:
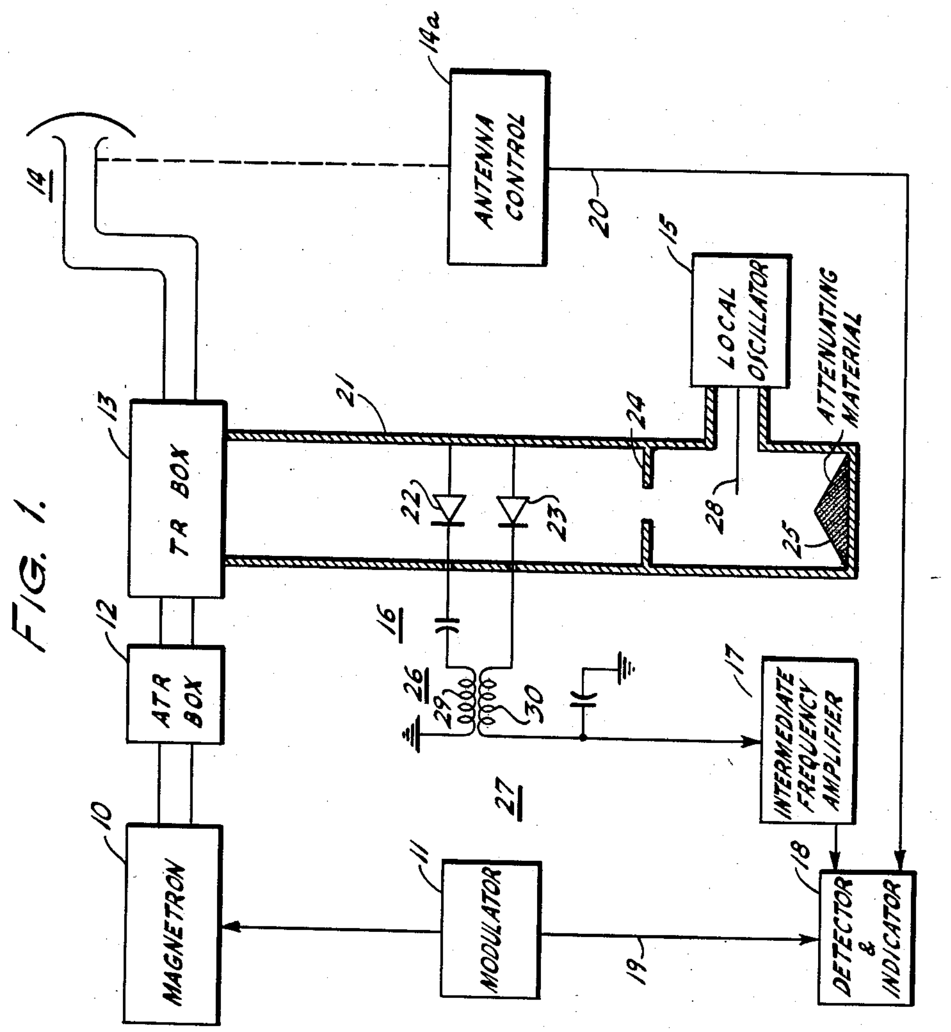

This invention is concerned broadly with the reduction, in microwave receiving systems, of received signals of a predetermined undesired frequency. It is particularly useful in superheterodyne radar receivers, but is not therefore to be construed as limited to either the superheterodyne or the radar reception arts.

In any superheterodyne radar receiver, for example, a locally generated wave is caused to beat with an incoming signal wave to produce an intermediate frequency wave, which latter is amplified and detected to produce a video frequency wave. The locally generated ultra-high frequency wave may be of either higher or lower frequency than the desired incoming signal wave by an amount equal to the frequency of the intermediate frequency wave. For purposes of the present discussion, it will be assumed that the locally generated wave is of a higher frequency than the desired incoming signal wave by the amount described above. It will be clear that the principles of the invention are equally applicable if the reverse condition exists.

In either case a signal of the prescribed intermediate frequency may be produced by beating of the local oscillator signal with incoming signals of either of two distinct and different frequencies, which frequencies are respectively higher and lower than the local oscillator frequency, and each of which differs from the latter frequency by an amount equal to the intermediate frequency. In conformity with established terminology, the two possible incoming signals, with either of which the local oscillator is capable of beating at any one time to produce the prescribed intermediate frequency signal, will hereinafter be referred to as "the desired signal" and "the image signal," respectively; and it is to be understood that the signal which is to be suppressed is always referred to as the image signal.

Heretofore, in order to obtain high signal-to-noise ratio in radar reception, it has been necessary to use sharply tuned TR boxes in an effort to exclude incoming signals of every frequency except the desired frequency. The term TR box is well known in the radar art and is conventionally applied to a system which prevents any appreciable portion of the transmitted pulse from being received, but allows substantially all of the reflected pulse to be received. It was particularly desirable, of course, to have the TR box so tuned as to exclude the incoming image signal, since the tuning of the intermediate frequency stages had no limiting effect on that image signal. In a radar set, the image signal, with which this discussion deals, is usually caused by noise of the image frequency, rather than by interference from another transmitter. However, since the magnetron conventionally used in radar transmitters to provide the transmitted pulse, and, by reflection, also the desired receiver signal, is subject to relatively large variations in frequency of operation due to conditions beyond the control of the operator, when a sharply tuned TR box was used, it had to be retuned to a different frequency each time the magnetron changed its frequency. The TR box also had to be retuned when one magnetron was replaced with another, since it is very difficult to obtain two magnetrons which oscillate at precisely the same frequency even though their nominal frequencies be the same.

According to the present invention it is proposed to avoid this difficulty by using a TR device which inherently is of sufficiently broad bandwidth to obviate the need for retuning when the frequency of the magnetron shifts, or when the tube is replaced. This, however, means that, in general, the bandwidth of the TR device will be such as to permit the transmission to the receiver circuits of image noise. This, in turn, necessitates the provision of an image noise suppressor capable of operating effectively at microwave frequencies.

It is therefore the principal purpose of the present invention to provide means, particularly adapted for use in the reception of microwave signals, for mixing incoming signals with a local oscillator signal in such a manner as to obtain a beat signal with the desired signal but substantially no beat signal with the image signal.

It is another purpose of the present invention to provide an improved superheterodyne image rejector particularly suitable for use with microwave receiving systems.

It is still another purpose of the present invention to provide a radar or high frequency receiving system having reduced susceptibility to noise interference.

A still further object of the present invention consists in providing a radar system in which the transmitting tube can be replaced without need for returning the radio frequency system.

These and other objects of the present invention will become more clearly evident from the following description and accompanying drawing.

Figure 2:
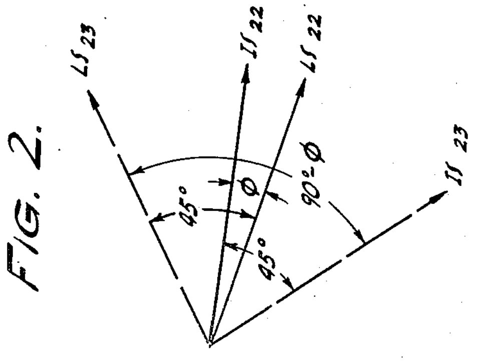

Any recital of the feature or features which broadly characterize this invention, if interposed at this point, could hardly be very intelligible to anyone not already acquainted with the invention. So, for that reason, I shall reserve for incorporation into the detailed description to follow any statement which may seem apropos as to what I consider to be the scope of my inventive concept. This description will be more readily understood with reference to the accompanying drawings in which:

Figure 1 is a schematic diagram of the essential elements of a conventional radar transmitter and receiver embodying the present invention, and Figure 2 is a vector diagram to which reference will be made in explaining the operation of the embodiment of Figure 1.

Referring now in more detail to the drawing, the apparatus shown comprises a source of transmitted signal such as magnetron 10, a modulator 11, an ATR box 12, a broadband TR box 13, an antenna 14, a local oscillator 15, a mixer stage 16, an intermediate frequency amplifier 17, and a conventional detector and indicator arrangement 18. Means 14*a* may be provided for systematically varying the orientation of antenna 14 and control circuits 19 and 20 may be included for the transmission of time data to the indicator. Magnetron 10, ATR box 12, TR box 13 and antenna 14 are interconnected by waveguides or other suitable microwave transmission elements, as schemaitcally indicated. It is understood that the other components are interconnected by conductors suitable for the frequency of the particular wave or signal to be conducted. The more conventional elements of the system illustrated, which conform to those of conventional practice, have been indicated by appropriately labeled boxes; the mixer 16, however, which is in accordance with the present invention, has been shown in greater detail.

As in a conventional radar system, modulator 11 may supply time-spaced impulses at a suitable repetition rate to magnetron 10 to control the production by the latter of similarly time-spaced pulses of microwave energy. These pulses, in turn, are supplied through ATR box 12 and TR box 13 to antenna 14 for transmission. TR box 13 and ATR box 12 are devices well known in the art for confining the transmitted and received energies respectively to their proper channels in the system, and therefore need not be discussed in detail. Reflections of transmitted energy from target objects are also received by antenna 14, and are supplied through TR box 13 to the input of mixer 16 for conversion to intermediate frequency. The intermediate frequency output from the mixer is amplified in amplifier 17 and is supplied to conventional detector and indicator circuits 18 whose operation may be coordinated in conventional manner with the pulsing of the transmitter magnetron, and with the motion of the antenna by control signals supplied to them through connections 19 and 20 respectively from modulator 11 and antenna 14.

As hereinbefore mentioned, TR box 13 is designed, in accordance with well-known practice, to have a bandwidth sufficiently broad to accommodate the normally expected variations in the frequency of magnetron 10 as well as variations from the nominal value of different tubes of the same nominal rating. For example, in the case of a system intended to operate at a frequency of 9375 megacycles, the TR box may be designed so as to pass a band extending 250 megacycles on either side of this frequency. If the intermediate frequency selected is 60 megacycles, it will then be apparent that image signals at a frequency of 9495 magacycles, as well as desired signals of frequency in the neighborhood of 9375 megacycles will be passed through TR box 13 to mixer 16. To prevent undesirable interference with the operation of the detector and indicator circuits 18, mixer 16 is constructed, in accordance with the invention, so as to prevent transmission to I–F amplifier 17 of signals and noise at the image frequency. The details of such construction will now be set forth.

Mixer stage 16 comprises a wave-guide 21 coupled through TR box 13 to the wave-guide connecting ATR box 12 and antenna 14, two crystal mixers 22 and 23, an iris 24, a load 25 and transformer coupled L–C networks 26 and 27. During receiving periods of the radar set, waves of both image and desired frequencies are received by antenna 14 and directed through the broadband TR box 13 into wave-guide 21 and then propagate down the wave-guide toward the iris. The wave generated by local oscillator 15 is introduced into wave-guide 21 by a suitable coupling element, such as probe 28, and is propagated through iris 24 toward the end of wave-guide 21 connected to TR box 13. Load 25 is used to prevent reflections of the local oscillator wave which would cause interference with the unreflected oscillator wave, and may consist of a suitably tapered block of attenuating material placed in the wave-guide as shown. Iris 24 prevents any substantial portion of the incoming desired signal and image signal from penetrating into the region occupied by probe 28 and load 25, while permitting passage of sufficient local oscillator signal from probe 28 to the mixers. While the presence of load 25 and iris 24 in practice contribute to the good performance of the system, they do not constitute an essential part of the invention and other means for accomplishing substantially the same effect may be utilized.

The mixers 22 and 23, which may be crystals or of any other conventional type suitable for use with wave-guides, are disposed in the wave-guide so as to be separated, in the direction of the axis of the wave-guide, by a distance equal to approximately one-eighth of the wavelength of one of the three waves under consideration. In this connection it should be kept in mind that the wavelength of the waves in the guide will not be the same as in air. While it is important that a correction for this change in wavelength be applied, this correction is so well known that it does not appear to warrant detailed discussion here.

It will be understood that it is not essential that the mixers 22 and 23 be physically located within the wave-guide, but instead it suffices that they be so coupled to the wave-guide as to be sensitive to waves propagated in the wave-guide at the points indicated. This will result in a phase displacement between the desired signal, the image signal and the local oscillator signal, when each signal is observed simultaneously at mixers 22 and 23. Since the frequency separation between the ordinary desired and image microwave signals is small compared to the frequency of either, and since the local oscillator frequency is midway between these two incoming signal frequencies, a spacing between the crystal mixers equal to one-eighth of the wavelength of one of the three waves, will result in a phase displacement of substantially 45° between the crystals for each of the waves. But while this phase displacement will be in the same sense for the image and desired signals, it will be in the opposite sense for the local oscillator signal, resulting in a total phase displacement between each of the incoming signals with respect to the local oscillator signal of 90°, as between mixer 22 and mixer 23. This will more readily be seen by reference to the vector diagram of Fig. 2. Here the incoming and local oscillator signals are represented respectively by vectors bearing the designations IS and LS, the subscripts 22 and 23 to these designations indicating respectively that the signals are observed at mixer 22 or mixer 23. Considering the incoming and local oscillator signals as they will exist at mixer 22, in general they will differ in phase by some arbitrary angle, which may be designated $\phi$ as indicated in the diagram. Further it is to be observed that the phase of the incoming signals will vary progressively as they traverse the length of the waveguide section 21 from the TR box toward mixers 22 and 23. More particularly the incoming signals as observed at mixers 22 and 23 respectively will, owing to the one-eighth wavelength displacement between the mixers, differ in phase by 45°, as indicated by the angular displacements of vectors $IS_{22}$ and $IS_{23}$ in the diagram. Similarly, the phase of the local oscillator signals will vary progressively as they traverse the waveguide section 21 from the probe 28 toward mixers 22 and 23. As observed at mixers 22 and 23 respectively, they likewise will differ in phase by 45°, as represented by the angular displacements of vectors $LS_{22}$ and $LS_{23}$ in the diagram. From inspection of the diagram, it will be seen that the phase angle between the local oscillator signal and the incoming signal at mixer 23 is $90°-\phi$ or, in other words, that it differs by 90° from the phase angle $\phi$ between the same two signals at mixer 22. This analysis is perfectly general in that it is applicable no matter what the initial phase angle $\phi$ may be. Consequently it applies to the desired incoming signal as well as to the image incoming signal, even though the phase angles $\phi$ between each of these incoming signals and the local oscillator signals may not be the same. While the preferred embodiment of my invention is arranged to produce the abovementioned phase shift between mixer 22 and mixer 23 by spacing those mixers one-eighth wavelength apart, it will be understood that the same relative phase shift may be obtained by adding to this spacing between mixer 22 and mixer 23 any integral number of one-half wavelengths. The effect produced by the mixers on the incoming and local oscillator signals is somewhat more complicated and cannot readily be explained by reference to the vector diagram. It is desirable, therefore, to express the results mathematically. To this end it may be assumed that the incoming desired signal is of the form $A \sin \omega_A t$, that the incoming image signal is of the form $B \sin \omega_B t$, and that the local oscillator signal is of the form $L \sin \omega_L t$. In these expression, $\omega_A$, $\omega_B$ and $\omega_L$ are proportional to the frequencies of the incoming desired, the incoming image and the local oscillator signals respectively. The effect of the mixer upon a pair of signals of different frequencies applied to its input will be to produce in its output a signal which is the product of the two input signals, except that the difference frequency components will all be of positive frequency even though multiplication of the mathematical expressions representing the input signals may yield terms of apparently negative frequency. Thus, if the incoming and local oscillator signals applied to mixer 22 are of the form indicated above, and if the frequencies of the desired and image signals are respectively greater and less than the frequency of the local oscillator signal, the output of the mixer, produced in response to the incoming desired and local oscillator signals, will be given by the expression:

$$\frac{AL}{2}\cos(\omega_A-\omega_L)t-\frac{AL}{2}\cos(\omega_A+\omega_L)t \qquad (1)$$

and that produced in response to the incoming image and local oscillator signals will be given by the expression:

$$\frac{BL}{2}\cos(\omega_L-\omega_B)t+\frac{BL}{2}\cos(\omega_B+\omega_L) \qquad (2)$$

As indicated by the vector diagram of Fig. 1, if the incoming and local oscillator signals at mixer 22 are of the form assumed in the derivation of expressions (1) and (2), the corresponding signals at mixer 23 will be of like form but will differ in phase to an extent such that the incoming desired signal will be of the form $A \sin(\omega_A t-45°)$, the incoming image signal will be of the form $B \sin(\omega_B t-45°)$, and the local oscillator signal will be of the form $L \sin(\omega_L t-45°)$. Then the output of mixer 23, produced in response to the incoming desired and local oscillator signals, will be given by the expresion:

$$\frac{AL}{2}\cos\left[(\omega_A-\omega_L)t-90^\circ\right]-\frac{AL}{2}\cos\left(\omega_At+\omega_Lt\right)\quad(3)$$

and that produced in response to the incoming image and local oscillator signals will be given by the expression:

$$\frac{AL}{2}\cos\left[(\omega_L-\omega_B)t+90^\circ\right]-\frac{AL}{2}\cos\left(\omega_B+\omega_L\right)t\quad(4)$$

In each of the expressions (1), (2), (3) and (4), only one of the two terms—either the sum or the difference frequency term—is selected as the intermediate frequency. It may be assumed, for example, that, as is customary, the difference frequency term is selected. Then it will be obvious from a comparison of these terms in expressions (1) and (3) that the desired I–F signal at the output of mixer 23 lags that at the output of mixer 22 by 90°, and, from a comparison of the corresponding terms in expressions (2) and (4), that the image I–F signal at the output of mixer 23 leads that at the output of mixer 22 by 90°. Having produced, between mixer 22 and mixer 23, a phase shift of 90° in one sense in the desired signal, and in the opposite sense in the image signal, the output of one of the mixers is now displaced in phase by a further 90° and combined subsequently with the output of the other mixer in any suitable manner before applying the mixer signals to the intermediate frequency stage input. This further 90° phase shift of one mixer output, followed by addition to the other mixer output, results in the cancellation of the intermediate frequency due to either the image or the desired signal depending upon the direction of the second 90° phase shift. A preferred means of obtaining this phase shift and addition consists of two tuned circuits 26 and 27, tuned to resonance at the intermediate frequency of the system. The respective inductors 29 and 30, of the tuned circuits 26 and 27, are so disposed that inductive coupling is obtained between them. Their turns are wound in the direction needed to supply the proper direction of phase shift, and the coupling between the windings is adjusted so that the intermediate frequency signal induced in circuit 27 by the signal in circuit 26 is substantially equal in magnitude to the intermediate frequency signal directly developed across circuit 27. This results in substantial cancellation of the intermediate frequency signal due to the image signal. Since the intermediate frequency signal due to the desired signal is 180° out of phase with that due to the image signal, as hereinbefore demonstrated, the same further phase shift of 90° which causes the intermediate frequency signals due to the image signal to cancel upon addition, will cause the intermediate frequency signals due to the desired signal to add, producing a desired intermediate frequency signal of substantially twice the magnitude which would be obtained with either mixer.

Thus, the system of the present invention provides for the substantial elimination of noise present at the image frequency without the necessity of providing any tuning elements preceding the mixer stage. Noise of other frequencies present in the incoming signal will, of course, be eliminated by the tuning of the intermediate frequency stage, and need therefore not be considered here. An ancillary result is that, should the image signal not be completely cancelled, due to limited perfection of physical apparatus, the increase in the desired signal simultaneously provided by the present invention will, of itself, provide a high signal-to-noise ratio at the input to the intermediate frequency stage, thus offsetting, to a large extent, imperfections due to physical components.

Since it is not always necessary to obtain complete suppression of the image signal, it will be evident that the present invention contemplates partial suppression of the image signal as well as complete, or substantially complete suppression.

While I have illustrated and described a form of the invention which I presently regard as the preferred embodiment, it will be apparent to those skilled in the art, that there are numerous practicable alternative arrangements within the scope and purview of my inventive concept.

I claim:

1. In a high frequency system; an elongated tubular wave-guiding element; means responsive to high frequency input signals for propogating waves in one direction longitudinally in said element; means responsive to locally generated signals for propagating waves in the opposite direction longitudinally in said element; a pair of wave interceptive elements disposed within said wave-guiding element and spaced one from the other longitudinally with reference to said wave-guiding element a distance which approximates one-eighth wavelength of said locally generated waves and of a desired input signal whose frequency differs from the frequency of said locally generated waves by an amount which is small compared to the absolute frequency of either, said wave-interceptive elements being responsive to waves impingent thereon to have signals induced therein which vary in accordance with the variations in said impingent waves; a pair of mixers, each mixer being connected to a different one of said wave-interceptive elements and each mixer being responsive to said desired signal and locally generated waves, impingent upon the wave interceptive element to which said mixer is connected, to produce heterodyne components of a predetermined frequency, and being also responsive to waves propagated in response to received signals of an undesired frequency, related to the frequency of said desired input signals, and to said locally generated waves impingent on said wave-interceptive element to produce heterodyne components of said predetermined frequency, and said heterodyne components produced by said mixers respectively differing in phase owing to the spacing between said wave-interceptive elements; means for producing a mutual phase shift of substantially ninety degrees between the outputs from said mixers and for additively combining said additionally mutually phase shifted heterodyne components to yield a resultant signal in which the heterodyne components corresponding to said undesired input signals are diminished in amplitude.

2. In a high frequency system; an elongated tubular wave-guiding element; means responsive to high frequency input signals for propagating waves in one direction longitudinally in said element; means responsive to locally generated signals for propagating waves in the opposite direction longitudinally in said element; a pair of wave-interceptive elements disposed within said wave-guiding element and spaced one from the other longitudinally with reference to said wave-guiding element a distance which approximates the sum of one-eighth wavelength and an integral number of one-half wavelengths of said locally generated signal, and of a desired input signal whose frequency differs from the frequency of said locally generated waves by an amount which is small compared to the absolute frequency of either, said wave-interceptive elements being responsive to waves impingent thereon to have signals induced therein which vary in accordance with the variations in said impingent waves; means responsive to said desired signal and to locally generated waves impingent on each of said wave-interceptive elements to produce heterodyne components of a predetermined frequency and also responsive to waves propagated in response to received signals of an undesired frequency related to the frequency of said desired input signals, and to said locally generated waves impingent on each of said wave-interceptive elements to produce heterodyne components of said predetermined frequency, said last-named means comprising a pair of circuit elements, each having a non-linear voltage-current characteristic and each being coupled to a different one of said wave-interceptive elements, and said heterodyne components produced by said circuit elements respectively differing in phase owing to the spacing between said wave-interceptive elements; means for producing a mutual phase shift of substantially ninety degrees between the outputs from said circuit elements and for additively combining said additionally mutually phase shifted heterodyne components to yield a resultant signal in which the heterodyne components corresponding to said undesired input signals are diminished in amplitude.

3. In a high frequency system, a mixer stage for combining high frequency input and locally generated waves to produce intermediate frequency signals; said mixer stage comprising an elongated tubular wave-guiding element; means responsive to input signals for propagating waves of corresponding frequency in one direction longitudinally in said element; means for propagating locally-generated waves of predetermined frequency in the opposite direction longitudinally in said element; a pair of mixers disposed within said element and spaced one from the other longitudinally with reference to said element a distance which approximates one-eighth wavelength of said locally-generated waves and of a desired input signal, each of said mixers being responsive to said desired signal and locally generated waves impingent thereon to produce heterodyne components of predetermined frequency, and being also responsive to waves propagated in response to input signals of an undesired frequency, related to the frequency of said desired input signals, and to said locally-generated waves impingent thereon, to produce heterodyne components of said predetermined frequency, and said heterodyne components produced by said mixers respectively differing in phase owing to the spacing between said mixers; a phase shifter supplied with the heterodyne components from at least one of said mixers for producing an additional mutual phase shift of substantially ninety degrees between the heterodyne components from said mixers respectively and for additively combining said additionally mutually phase-shifted heterodyne components to yield a resultant signal in which the heterodyne components corresopnding to said desired input signals are enhanced, while the heterodyne components corresponding to said undesired input signals are diminished in amplitude.

4. In a high frequency system; an elongated tubular wave-guiding element; means responsive to input signals for propagating waves of corresponding frequency in one direction longitudinally in said element; radiating means responsive to locally-generated signals for propagating waves of corresponding frequency in the opposite direction longitudinally in said element; a pair of mixers disposed within said element, both of said mixers being displaced in the same direction with reference to said radiating means and being spaced one from the other longitudinally with reference to said element a distance which approximates one-eighth wavelength of said locally-generated wave and of a desired input signal, said mixers being each responsive to said desired signal and locally-generated waves impingent thereon to produce heterodyne components of predetermined frequency, and being also responsive to waves propagated in response to input signals of an undesired frequency, related to the frequency of said desired input signals, and to said locally-generated waves impingent thereon to produce heterodyne components of said predetermined frequency, and said heterodyne components produced by said mixers respectively differing in phase owing to the spacing between said mixers; an iris disposed within said element between said radiating means and said pair of mixers, said iris being constructed and arranged to impede the transmission of waves propagated in response to said input signals, and to transmit waves propagated in response to said locally-generated signals; a phase shifter supplied with the heterodyne components from at least one of said mixers for producing an additional mutual phase shift of substantially ninety degrees between the heterodyne components from said mixers respectively and for additively combining said additionally mutually phase-shifted heterodyne components to yield a resultant signal in which the heterodyne components corresponding to said desired input signals are enhanced, while the heterodyne components corresponding to said undesired input signals are diminished in amplitude.

5. In a high frequency system, an elongated tubular wave-guiding element substantially closed at one end; means responsive to input signals for propagating waves of corresponding frequency in one direction longitudinally in said elements; radiating means located near the closed end of said element and responsive to locally-generated signals for propagating waves of corresponding frequency in the opposite direction longitudinally in said element; a pair of mixers disposed within said element and spaced one from the other longitudinally with reference to said element a distance which approximates one-eighth wave-length of said locally-generated wave and of a desired input signal, said mixers being each responsive to said desired signal and locally-generated waves impingent thereon to produce heterodyne components of predetermined frequency, and being also responsive to waves propagated in response to input signals of an undesired frequency, related to the frequency of said desired input signals, and to said locally-generated waves impingent thereon to produce heterodyne components of said predetermined frequency, and said heterodyne components produced by said mixers respectively differing in phase owing to the spacing between said mixers; attenuating means disposed within said element between said radiating means and the closed end of said element; said means being adapted to attenuate, substantially without reflection, waves impingent thereon; a phase shifter supplied with the heterodyne components from at least one of said mixers for producing an additional mutual phase shift of substantially ninety degrees between the heterodyne components from said mixers respectively and for additively combining said additionally mutually phase-shifted heterodyne components to yield a resultant signal in which the heterodyne components corresponding to said desired input signals are enhanced, while the heterodyne components corresponding to said undesired input signals are diminished in amplitude.

6. In a high frequency system, a mixer stage comprising an elongated tubular wave-guiding element adapted to have input signals introduced into one end thereof, a local oscillator, means coupling said local oscillator to said element near the other end of said element, a pair of crystal mixers disposed within said element and spaced one from the other longitudinally with reference to said element a distance which approximates one-eighth wavelength at the frequency of said local oscillator, said mixers being operative to mix waves impingent thereon, a pair of tuned circuits, each supplied with the output from a different one of said mixers, at least one of said circuits being detuned from the frequency of the outputs from said mixers to produce a mutual phase shift of substantially ninety degrees between said outputs and said circuits being mutually inductively coupled to effect additive combination of said phase-shifted signals, and means for deriving a resultant combined signal from at least one of said circuits.

References Cited in the file of this patent

UNITED STATES PATENTS

| Number | Name | Date |
|---|---|---|
| 2,106,768 | Southworth | Feb. 1, 1938 |
| 2,142,159 | Southworth | Jan. 3, 1939 |
| 2,375,223 | Hansen | May 8, 1945 |
| 2,442,606 | Korman | June 1, 1948 |